(No Model.)

J. L. EASLEY.
LEMON SQUEEZER.

No. 438,069. Patented Oct. 7, 1890.

WITNESSES:
J. Henry Thieberath
E. M. Clark

INVENTOR:
John L. Easley
BY
Munn & Co.
ATTORNEYS

UNITED STATES PATENT OFFICE.

JOHN L. EASLEY, OF NEW YORK, N. Y.

LEMON-SQUEEZER.

SPECIFICATION forming part of Letters Patent No. 438,069, dated October 7, 1890.

Application filed May 12, 1890. Serial No. 351,388. (No model.)

*To all whom it may concern:*

Be it known that I, JOHN L. EASLEY, of New York city, in the county and State of New York, have invented a new and useful Improvement in Lemon-Squeezers, of which the following is a full, clear, and exact description.

My invention relates to an improvement in lemon-squeezers, and has for its object to provide a device simple, durable, and economic, adapted for use in connection with any suitable receptacle—a tumbler, for instance—and so constructed that all the released juices of the fruit will be conducted to the receiving-vessel and the pulp effectually prevented from entering the same.

A further object of the invention is to provide a means whereby the juice of the fruit may be more expeditiously extracted than has heretofore been accomplished with articles of like character, and whereby also a number of lemons may be manipulated upon the device without the necessity of repeatedly cleaning it, (the last with equally good results as the first,) thus obviating a trouble at present existing, which tends greatly to lessen the usefulness of such devices.

Another object of the invention is to so construct the device that it will be adapted to firmly rest upon receptacles of various diameters.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
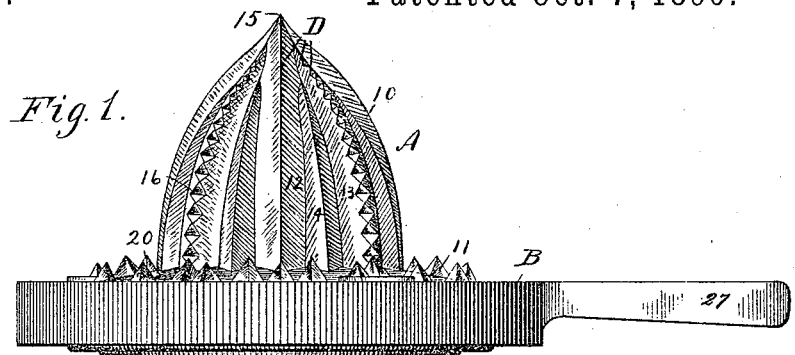
Figures 2, 3:
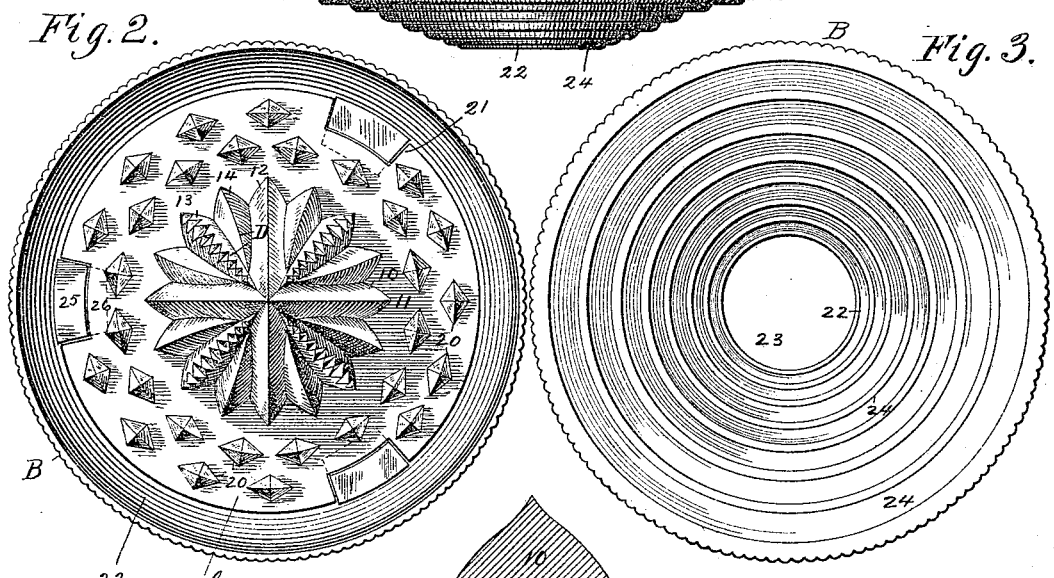
Figure 4:
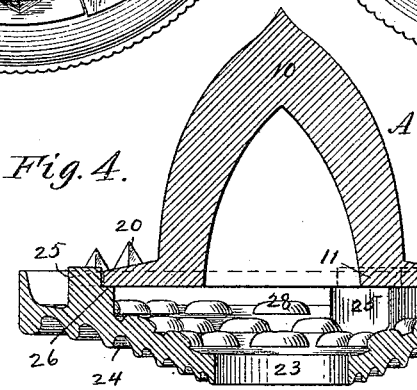
Figure 5:
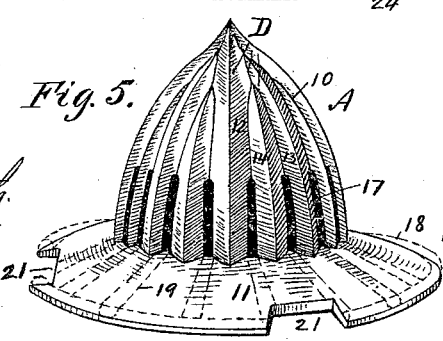

Figure 1 is a side elevation of the complete article. Fig. 2 is a plan view thereof, the cup being illustrated without a handle. Fig. 3 is a bottom plan view of the cup. Fig. 4 is a central vertical section through the complete device as illustrated in Fig. 1; and Fig. 5 is a perspective view of the cap, illustrating modifications in the construction thereof.

The device may properly be said to consist of a cap A and a cup B. The cap A consists of a conical section 10 and a base-flange 11, the former being preferably hollow, and the upper face of the latter being beveled from the center downward in the direction of the periphery, as is best shown in Fig. 4. The conical section and flange are ordinarily made in one piece, but may be constructed of separate pieces and united in any approved manner.

The conical section of the cap is of peculiar external contour, the object being to provide for the speedy extraction of the juice from the fruit and a rapid and uninterrupted delivery of said juice to the inclined face of the flange. To that end multiple series of ribs D are longitudinally formed upon the outer surface of the said conical section, and each multiple series is composed, preferably, of a series of three ribs 12, 13, and 14 of varied lengths, the said rib 12 being the longest, the opposite side rib next in length, and the intermediate rib 14 the shortest. Although three ribs only are shown as constituting each multiple series, a greater or less number may be substituted if in practice it is found desirable. The ribs are preferably triangular in cross-section, or essentially so, and taper longitudinally, being widest at the base of the cone. When three ribs constitute each multiple series, the upper end of the rib 13 loses itself in one side of the rib 12, and the upper end of the intermediate rib 14 merges into the upper inner side faces of both of the outer or side ribs, as is best illustrated in Figs. 1, 2, and 5. In the further formation of the conical section the longitudinal rib 12 of each of the multiple series unite to form a decidedly sharp apex 15.

The construction of the cone may be modified without departing from the spirit of the invention—as, for instance, any one or more of the ribs of the multiple series may be provided with notches 16 in the outer edge, or said edge may be otherwise roughened; or at the base of the conical section of the cap longitudinal openings 17 may be formed between the ribs, the said openings being of sufficient width to permit the juice to pass directly from the exterior of the cone to the interior, but sufficiently small to exclude the passage of the pulp in the same direction.

It will be observed that by shaping the conical section of the cap as above described welldefined cutting or abrading surfaces are obtained, and decided channels or gutters are formed between said surfaces for the speedy exit or conduct of the extracted juices.

The flange 11 preferably constitutes an integral portion of the cone, and is ordinarily given a circular contour. The peripheral surface of the flange may be upturned, if desired, to form a marginal rib 18, as shown in dotted lines, Fig. 5, and provided with furrows or channels 19 in its upper face, (illustrated in like manner in the same figure,) which channels or furrows may lead up to or be cut through the rib.

The rib 18 is intended to retain the pulp upon the flange, and the channels serve as conductors for the juice; or the upper surface of the flange may be smooth. In practice, however, it is found desirable to form obstructions upon the beveled face of the flange in order to prevent the pulp of the lemon from reaching the periphery, and at the same time provide for a free flow of the juice to and over the edge of the flange. One means of accomplishing this result, in addition to that heretofore described, consists in serrating or roughening the upper face of the flange; but preferably the construction shown in Figs. 1, 2, and 4 is employed, from which it will be observed that baffle-lugs 20 are formed upon the flange, partaking ordinarily of the shape of embossed facets, grouped to form a series of irregular figures; but the shape of the lugs may be varied at will.

The formation of the cap is completed by producing in the margin thereof at desired intervals recesses 21.

The cup B used in connection with the cap is of greater diameter than the diameter of the flange of said cap. Both faces of the bottom 22 of the cap are made to slope downward from the margin to a central opening 23, especially the upper face, and in the under face of the bottom a series of preferably annular grooves 24 is produced, ordinarily concentrically located and graduated in depth and width, the said grooves being spaced in accordance with the graduations in the sizes of the receiving-receptacles to be used. Ordinarily the spaces are made to conform to the graduations in the size of glass tumblers or goblets. The grooves 24 are not necessarily circular, but may be shaped to the contour of any peculiarly-designed receiver decided upon for use. Standards or feet 25 are attached to or formed integral with the inner face of the cup-bottom, which standards conform in number and shape to the flange-recesses 21. The said recesses may be of any contour found most desirable in practice.

When the cap is constructed detachable from the cup, a recess is ordinarily formed in the upper inner face of the standards, producing a shoulder 26, upon which shoulders the flange of the cap is supported, as best shown in Fig. 4, and as the standards fit comparatively snugly the recesses 21 when the cap is placed in position upon the cup the former is effectually held from turning when a lemon is manipulated upon the cone. The standards are of sufficient height to provide for ample space between the opposed faces of the cap and cup to admit of a free passage of the juice from the cap to the opening in the bottom of the cup.

If the cap and cup are not made separable, the standards are employed as a connecting medium, and are attached to both in any approved manner, and both the cap and cup may be provided with a handle 27, or the handles may be dispensed with, or, as illustrated, the cup only may have a handle connected with it. When the handle is not used, the peripheral surface of the cup is serrated or otherwise roughened.

Ordinarily the upper face of the cup bottom is smooth but it may have protuberances 28 formed thereon, as illustrated in Fig. 4, to arrest the progress of any pulp that may escape from the flange of the cap and prevent it from passing downward with the juice into the receiving-vessel.

The entire device may be made of any suitable material—as, for instance, glass, rubber, porcelain, metal, &c.

Having thus described my invention, I claim as new and desire to secure by Letters Patent—

1. In a lemon-squeezer, a conical lemon-receiver provided with an exterior multiple series of ribs, each of which multiple series is composed of a series of ribs varying in length, substantially as shown and described.

2. In a lemon-squeezer, a conical lemon-receiver provided with an exterior longitudinal multiple series of ribs, each of which multiple series is composed of a series of ribs essentially triangular in cross-section and graduated in length.

3. In a lemon-squeezer, a conical lemon-receiver provided with an exterior longitudinal multiple series of ribs, each of which multiple series is composed of a series of longitudinal tapering ribs essentially triangular in cross-section and graduated in length, the longest ribs of the multiple series being united at the apex of the cone, substantially as described.

4. In a lemon-squeezer, a conical lemon-receiver provided with an exterior multiple series of ribs, each of which multiple series is composed of a series of longitudinal tapering ribs triangular in cross-section and of graduated lengths, the longer ribs of the multiple series being united at the apex of the cone, and sundry of the ribs being also provided with notched outer edges, as and for the purpose specified.

5. In a lemon-squeezer, a cup consisting of a conical lemon-receiver provided with an exterior multiple series of ribs, each of which multiple series is composed of a series of ribs varying in length, and a flange at the base of the conical section, having its upper face tapered downward in the direction of its outer edge, whereby the juices are conducted over the said edge, substantially as and for the purpose set forth.

6. In a lemon-squeezer, a cup consisting of a conical lemon-receiver provided with an exterior multiple series of ribs, each of which multiple series is composed of a series of ribs varying in length, and a flange formed at the base of the conical section, provided with a downwardly-beveled upper face, the said beveled face of the flange being roughened, as and for the purpose specified.

7. In a lemon-squeezer, a cup having the bottom inclined downward from the periphery to the center and provided in the central portion with an opening, and having a series of grooves in its under face, substantially as and for the purpose specified.

8. In a lemon-squeezer, a cup having the bottom inclined downward from the periphery to the center and provided in the central portion with an opening, and having a series of grooves upon its face and protuberances upon its upper face, as and for the purpose specified.

JOHN L. EASLEY.

Witnesses:
ALFRED LURCOTT,
EDWD. M. CLARK.